Figure 1:
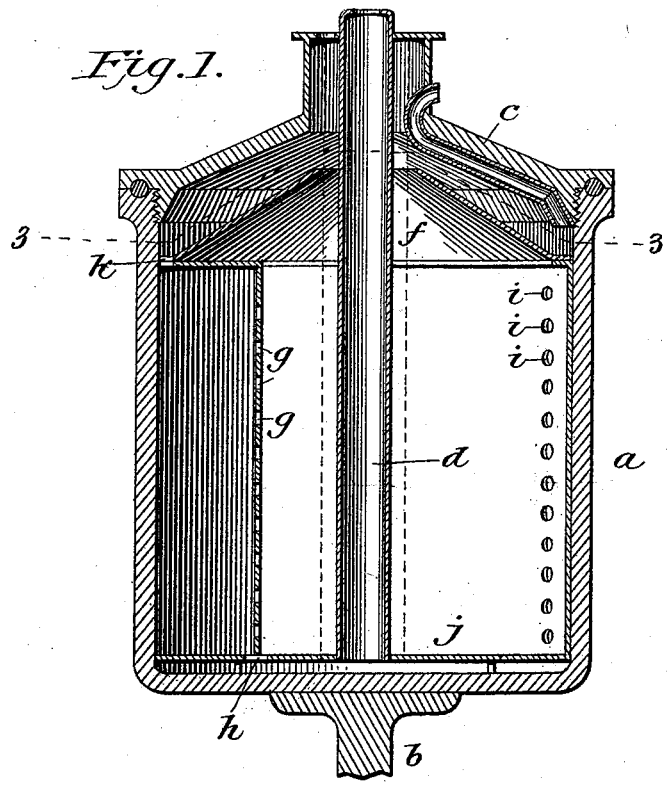

(No Model.) 2 Sheets—Sheet 1.

O. OHLSSON.
CENTRIFUGAL CREAMER.

No. 536,580. Patented Mar. 26, 1895.

Witnesses:
Nicholas M. Goodlett Jr.
H. L. Prince

Inventor
Olof Ohlsson
by his attorneys
Witter & Kenyon

THE NORRIS PETERS CO., PHOTO-LITHO., WASHINGTON, D. C.

(No Model.) 2 Sheets—Sheet 2.

O. OHLSSON.
CENTRIFUGAL CREAMER.

No. 536,580. Patented Mar. 26, 1895.

Witnesses:
Nicholas M. Goodlett
H. L. Prince

Inventor
Olof Ohlsson
by his attorneys
Witter & Kenyon

UNITED STATES PATENT OFFICE.

OLOF OHLSSON, OF NEWARK, NEW JERSEY.

CENTRIFUGAL CREAMER.

SPECIFICATION forming part of Letters Patent No. 536,580, dated March 26, 1895.

Application filed March 4, 1895. Serial No. 540,504. (No model.)

*To all whom it may concern:*

Be it known that I, OLOF OHLSSON, a citizen of the United States, residing at Newark, in the county of Essex, State of New Jersey, have invented a new and useful Improvement in Centrifugal Creamers, of which the following is a full, clear, and exact description.

Heretofore it has been common in centrifugal creaming machines to divide up the milk space of the bowl by numerous partitions variously disposed whereby the milk is divided up into numerous thin bodies or sheets or layers and subjected to the centrifugal action in the form of such thin bodies or sheets or layers; and in general, dependence has been placed upon the principle of accomplishing the cream separating by applying the centrifugal action simultaneously to many small bodies of milk as contradistinguished from applying the centrifugal action to the same milk in one larger body or mass, the milk that is being acted upon either passing in succession through the many small spaces and so being several times subjected to the centrifugal action, or being divided up among the many spaces each separate body of milk passing through substantially but one space and being acted upon but once, its separated constituents being then delivered from the machine. Numerous thin layers of strata or laminæ are unnecessary and in accordance with this invention good results can be attained by the action of centrifugal force upon milk in large thick bodies or masses if guiding plates are used which tend to gather the half separated cream and direct it in colliding currents and so cause it to coalesce. To that end I dispense with the use of numerous parallel partitions dividing the interior liquid space of the bowl and the milk that is being separated in it into numerous thin bodies, layers or strata, and instead I employ a single encircling frame of guiding plates placed in the outer portion of the liquid space and so arranged with respect to each other and to the lines of centrifugal force as to produce colliding currents of half separated cream particles, and to force the same through openings toward the center whereby coalescence of the cream particles is attained and the ultimate separation of the cream from the blue milk greatly furthered. In other words I dispense with the multiplicity of interior plates or partitions heretofore commonly used and employ a single series or frame of guide plates encircling the bowl center, each guide plate mechanically made in one piece as herein shown and preferred, but its portions, as $e'$ and $e^2$ functionally operating as two guide-plates or couples to direct the partly separated cream inward toward the common openings $g$ nearest the center, hereinafter referred to, said openings being preferably small or restricted in aggregate area as compared with the openings $i$ at the edge of the said such couples, and said guide portions extending in horizontal section from near the periphery of the bowl, in the liquid space within the bowl, to substantially a middle point radially of the liquid space within the bowl, and cutting obliquely the lines of centrifugal force the two currents colliding and the fatty particles coalescing at the openings $g$, and through which the separating cream is forced or crowded in its coalescing condition in toward the center. There are also preferably corresponding openings (but preferably larger in aggregate area of cross-section) at the points that are farthest from the center of the bowl permitting a counter current of separated blue milk, the separated blue milk being forced out by the more intense centrifugal action at such points operating upon the heavier ingredient and thereby crowding or forcing the half separated cream particles into collision and coalescence and inward through the first mentioned openings. This crowding and coalescing of the half separated cream particles together favors their further and more complete separation from the blue milk and renders the use of numerous parallel partitions and of many thin layers unnecessary. Moreover the preferred arrangement of guiding plates and openings described, to wit, with openings $i$ as well as openings $g$, see description below, permits corrective circulation if cream particles happen to be swept along with the current of blue milk through the openings $i$ or where blue milk particles are swept along with the current of cream particles through openings $g$. The avoidance of the necessity of using a multiplicity of parallel partitions reduces the total weight to be rotated, which is a consideration of great importance in hand machines. It also reduces the churning effects upon the cream in passing through the machine. It also facilitates all cleansing operations both by the simplicity and by the openness of the construction and renders a more nearly perfect balance of the machine more easily attainable.

In the preferred form of my invention I also employ a milk distributing base plate having openings for the full milk arranged under the guide plates as shown herein, whereby full milk is introduced on both sides of the series or frame of guide plates. In this case I prefer to have openings in the guide plates at points farthest from the center of the bowl, and I prefer that such openings should be larger in aggregate area of cross-section (as, for instance, by being more numerous) than the openings in the guide plates at the points nearest to the center.

My invention is illustrated in its preferred form in the accompanying drawings, in which—

Figure 2:
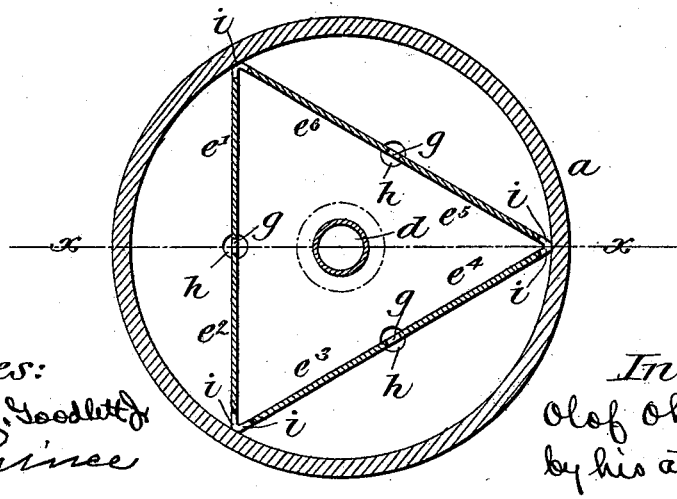
Figure 3:
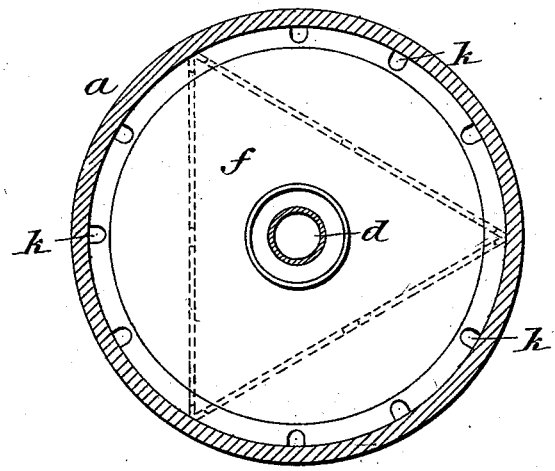
Figure 4:
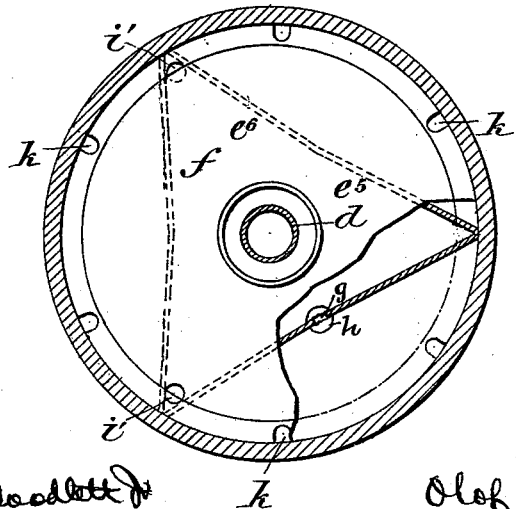

Figure 1, is a central vertical section of a centrifugal creamer embodying the invention. Fig. 2 is a horizontal section of the same, the vertical section, Fig. 1, being taken on line $x$ of Fig. 3. Fig. 3 is a horizontal sectional view on the line 3—3 of Fig. 1, and Fig. 4 is a view similar to Fig. 3, but showing modified features.

In said drawings, $a$, indicates the bowl supported on a vertical shaft, $b$, driven by motive mechanism of any suitable class or variety, and $c$ indicates the cover for said bowl which is open at the center to receive a supply pipe or duct $d$. Said cover is also provided with suitable outlets for the skim or blue milk, and for the cream, the said outlets being of any ordinary construction. Within said bowl are arranged guide plates forming portions $e'$, $e^2$; $e^3$, $e^4$; $e^5$, $e^6$, which are united together at their adjacent edges and form a solid triangular frame, which is removable from the bowl, these guide plates having two functional portions or couples, as $e'$ and $e^2$, also $e^3$ and $e^4$, also $e^5$ and $e^6$, lying in the same plane and so forming mechanically one plane plate and perforated as shown in Figs. 2 and 3, but constituting functionally, (by reason of the angle of one-half of the plate to the lines of centrifugal force being the reverse of that of the other half to the lines of centrifugal force) two guiding plates guiding currents of cream in opposite directions, that is into collision. The frame of guiding plates is preferably provided at the top with a conical head, $f$, the periphery of which, at its base, engages the side walls of the bowl, and the frame is suitably held thereto in any desirable manner, so that the said frame will rotate in unison with said bowl. The head $f$ is also provided with a series of apertures $k$ around its border, as shown in Figs. 1 and 3 to permit egress of the blue milk from the several outer milk spaces between the outer wall of the bowl and the plates. The guide plates of said frame are, in the particular form of machine shown in Figs. 1, 2 and 3 disposed within the bowl in lines parallel with chords of the bowl, the portions of each guide plate together constituting a chord of the bowl, and at their points of nearest approach to the center of the bowl the guide plates are provided with openings $g$, to allow an inward flow of partly separated cream. Said guide plates are also provided, at or near their opposite edges near the periphery of the bowl, with similar perforations, $i$, (double in number to the perforations $g$) to allow an outward flow of blue milk.

At the bottom of the bowl is arranged a horizontal plate, on which the triangular frame is seated. The said horizontal plate is centrally perforated to receive the lower end of the supply pipe or duct, $d$, and at points coinciding with the points where the guide plates approach nearest to the center of the bowl, the said horizontal partition is perforated, as at $h$, to admit an upflow of new or full milk from the chamber or passage below. Said perforations, $h$, are partly outside and partly inside of the said guide plates, as indicated in Fig. 2, so that the new milk is allowed an inflow on both sides of said plates.

In operating the device shown in Figs. 1, 2 and 3, the new milk supplied to the pipe, $d$, flows downward through the horizontal plate, and into the chamber below the same. It then flows outward, under the influence of centrifugal force, and upward through the openings or perforations, $h$, and passes up on both sides of the guide plates. Here continued exertion of centrifugal force impels a separation of the lighter and heavier particles of milk. The heavy blue milk in the inner chamber is driven out through the perforations, $i$, toward the periphery of the bowl, and the light cream in the outer chambers is partly separated and is crowded toward the center and is guided by the plates and gathers and coalesces at the perforations $g$ of the guide plates, and is forced through those perforations or openings. Corrective circulation, heretofore referred to, can occur indefinitely. The fully separated lighter and heavier fluids are allowed an exit through the respective cream and blue milk passages of the cover in the ordinary manner. The action of the centrifugal force is greatest in the outer parts (radially) of the liquid space of the bowl and it will be observed that the guiding plates are arranged largely in this part of the bowl. It will also be observed that the guiding portion or plate $e'$ (like each other guiding portion or plate) cuts obliquely the lines or directions of centrifugal force, thereby causing the formation of a cream current on the side of the plate that is away from the center, the direction of the current being toward the edge of the portion that is nearest the center (moving from near $i$ to $g$ in each case). It will also be observed that each couple of adjacent guide plates (as, for instance, $e'$ and $e^2$) guide their respective cream currents into collision or interference with each other, and also that the colliding cream currents are at once forced through common openings $g$, preferably restricted in aggregate area of cross-section in comparison with the aggregate area of cross section of the openings $i$ in those two guide plates or portions $e'$ and $e^2$, and common to the two guide plates or portions $e'$ and $e^2$, or rather to the cream currents produced by them. The latter feature secures the certainty of collision between the two currents for they pass inward through a common opening and the former feature tends to insure actual collision of the fatty particles of the currents, both features tending to secure coalescence of the half separated cream. The inflow of full milk into the inner triangular compartment is about equal to the inflow into the three outer compartments, whereas the outflow of fully separated cream from the inner compartment at the cream discharge outlet of the machine is much less in bulk than the outflow of fully separated blue milk from the three outer compartments. Accordingly the constant readjustment of liquid contents between the single inner and the three outer compartments that is constantly going on through the openings $g$ and $i$ would involve much less stress and motion at the openings $g$ than occurs at the openings $i$ unless the openings $g$ in aggregate area were relatively smaller, that is, were restricted, for more bulk of liquid must pass out of the inner compartment through $i$ than passes into it through $g$. The restricted openings $g$ cooperate to cause the collisions and coalescence of the cream particles that is desired. It is to be observed also that the colliding cream currents are not currents of already fully or substantially fully separated cream for the coalescence would in that case be useless to assist separation, but that they are currents of only partly created cream in which case limited coalescence is a valuable assistant in the separation. It will also be observed that the coalescence obtained is not broken up by subsequently dividing or obstructing the currents.

The device described, while very simple, and admitting of a very easy and quick cleansing, is effective in producing the desired results. The guide plates need not of course be arranged in the form of a triangular frame, nor need they be precisely six in number, or rectilinear. In fact many variations might be made from the form of device specifically shown in the drawings without departing from my invention.

In Fig. 4 the openings $i$ are omitted so that the blue milk within the frame cannot pass into the outer compartments. To permit the escape of blue milk, however, from the interior compartment of the bowl according to this arrangement, openings $i'$ are provided in the border of the top and at points within the inner compartment and farthest from the center. The milk in the outer compartment will now escape through the openings $k$, as before, but the blue milk within the inner compartment instead of passing into the outer compartments and out through openings $k$ will escape directly through their own openings $i'$.

In Fig. 4 the couples $e'$, $e^2$; $e^3$, $e^4$; $e^5$, $e^6$ are shown as converging inward instead of being in the same plane. The couples when thus arranged, however, operate in substantially the same way as when arranged in the same plane, guiding the cream particles always inward toward the center and causing them at the same time to collide and coalesce. With either arrangement of guide plates the openings $i$ could be employed, or these openings could be omitted and the openings $i'$ used.

Although the couples $e'$, $e^2$; $e^3$, $e^4$; $e^5$, $e^6$ are shown as made in one piece, of course they might be made in separate pieces and held in place by any suitable means, such as the ordinary braces, bars or plates, or otherwise; or these couples could be soldered or otherwise fastened together, so as to be held in place.

The joining together of the frame with the base plate and the conical head making them removable together from the bowl is not only a convenience in all cleansing operations, but it permits of a more perfect and maintained balance of the bowl throughout use.

Having thus described my invention, what I claim as new, and desire to secure by Letters Patent, is—

1. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of centrifugal force and arranged to act as couples, each couple disposed in substantially the same plane, and each couple having common openings at the points nearest to the center, whereby the partly separated cream particles are guided together and coalesced, substantially as shown and described.

2. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of centrifugal force and arranged to act as couples, each couple converging inward, and each couple having common openings at the points nearest to the center, whereby the partly separated cream particles are guided together and coalesced, substantially as shown and described.

3. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of centrifugal force and arranged to act as couples, each couple disposed in substantially the same plane, each couple having common openings at the points nearest to the center and openings at the points farthest from the center, whereby the partly separated cream particles are guided and forced together and coalesced, substantially as shown and described.

4. In a centrifugal creaming machine, the combination with a bowl and means for rotating the same and suitable inlet and outlet conduits of a single frame or series of guide plates arranged in the outer part (radially) of the liquid space of the bowl and encircling the bowl center and cutting obliquely the lines of centrifugal force and arranged to act as couples, each couple converging inward, and each couple having common openings at the points nearest to the center and openings at the points farthest from the center, whereby the partly separated cream particles are guided and forced together and coalesced, substantially as shown and described.

5. In a centrifugal creaming machine, the combination with a bowl and means for rotating the same, of a single frame or series of guide plates arranged in the outer part (radially) of the liquid space of the bowl and encircling the bowl center and cutting obliquely the lines of centrifugal force and arranged to act as couples, each couple having common openings at the points nearest to the center, whereby the liquid space is divided into an inner compartment and outer compartments, blue milk outlet conduits for the outer compartments and separate blue milk outlet conduits for the inner compartments, and suitable inlet conduits, whereby the partly separated cream particles are guided together and coalesced, substantially as shown and described.

6. In a centrifugal creaming machine, the combination with a bowl and means for rotating the same and suitable inlet and outlet conduits, of a single frame or series of guide plates arranged in the outer part (radially) of the liquid space of the bowl and encircling the bowl center and cutting obliquely the lines of the centrifugal force and arranged in couples, each couple having common openings at the points nearest to the center, and a milk distributing base plate having openings for the full milk, arranged under the guide plates, substantially as shown and described.

7. In a centrifugal creaming machine, the combination with a bowl and means for rotating the same, and suitable inlet and outlet conduits, of a single frame or series of guide plates arranged in the outer part (radially) of the liquid space of the bowl and encircling the bowl center and cutting obliquely the lines of centrifugal force and arranged in couples, each couple having common restricted openings at the points nearest to the center and corresponding but larger openings at the points farthest from the center, and a milk distributing base plate having openings for full milk arranged under the guide plates, substantially as shown and described.

8. In a centrifugal creaming machine, the combination with a bowl and means for rotating the same and suitable inlet and outlet conduits of a single frame or series of guide plates arranged in the outer part (radially) of the liquid space of the bowl and encircling the bowl center and cutting obliquely the lines of centrifugal force and arranged in couples, each couple having common openings at the points nearest to the center and corresponding openings at the points farthest from the center, and a milk distributing base plate having openings for full milk arranged under the guide plates and a conical upper head or plate secured to the tops of the guide plates and constructed to engage the side walls of the bowl, said plates being all joined together and removable together from the bowl, substantially as shown and described.

OLOF OHLSSON.

Witnesses:
NICHOLAS M. GOODLETT, Jr.,
WM. H. DE LACY.